June 2, 1925.
C. C. COLBERT ET AL
1,540,721
HANG-UP APPARATUS
Filed Oct. 3, 1923
7 Sheets-Sheet 5
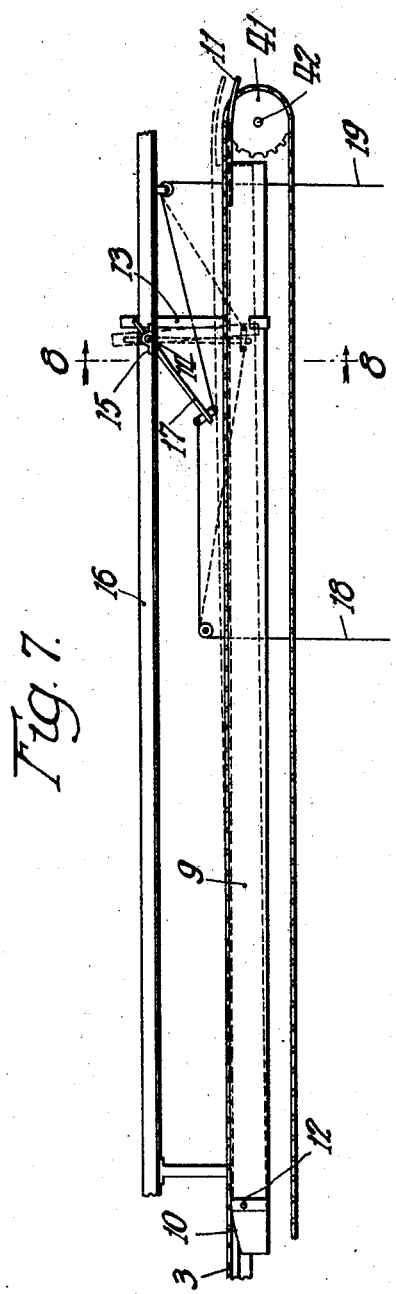
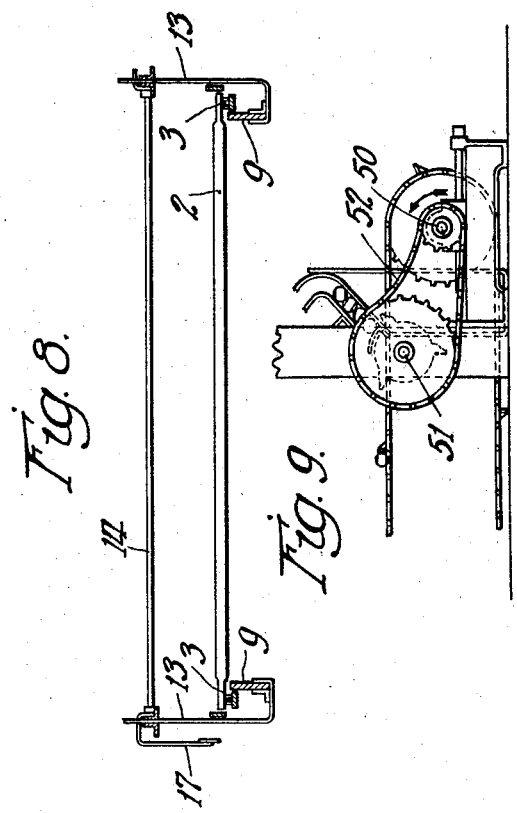
Inventors.
Charles C. Colbert.
George E. Preston.

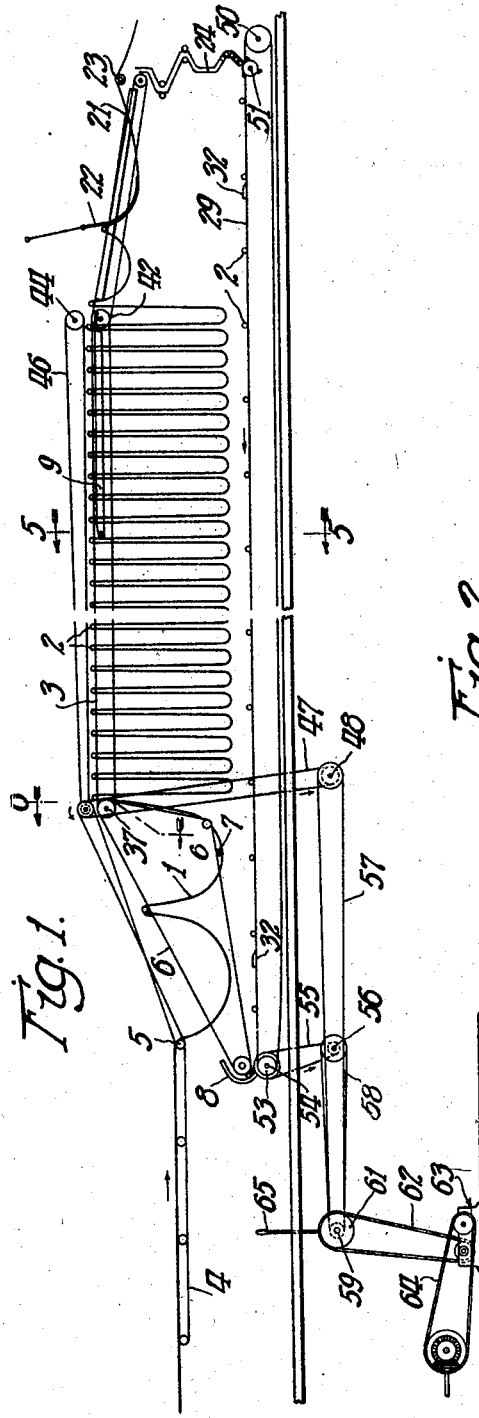

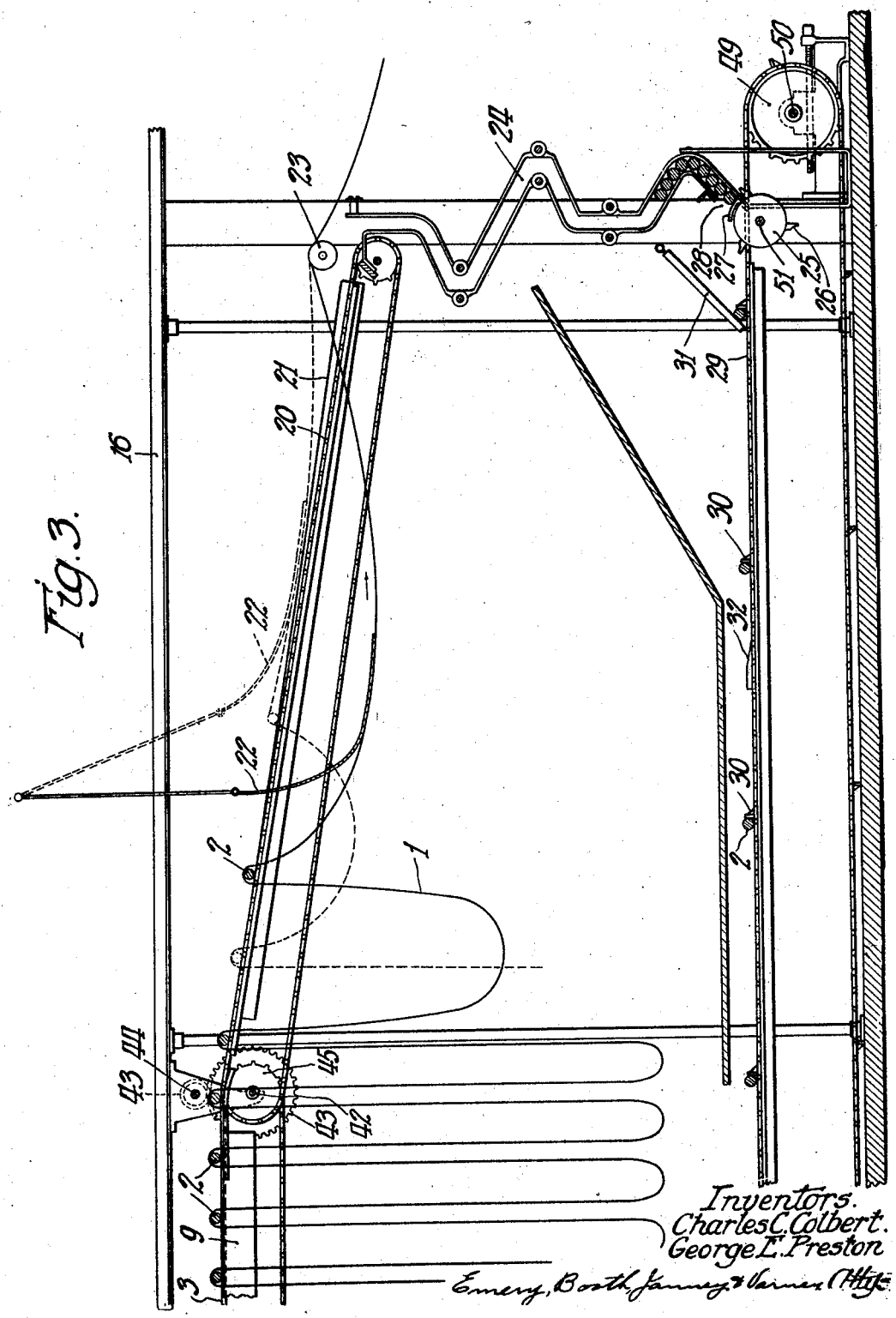

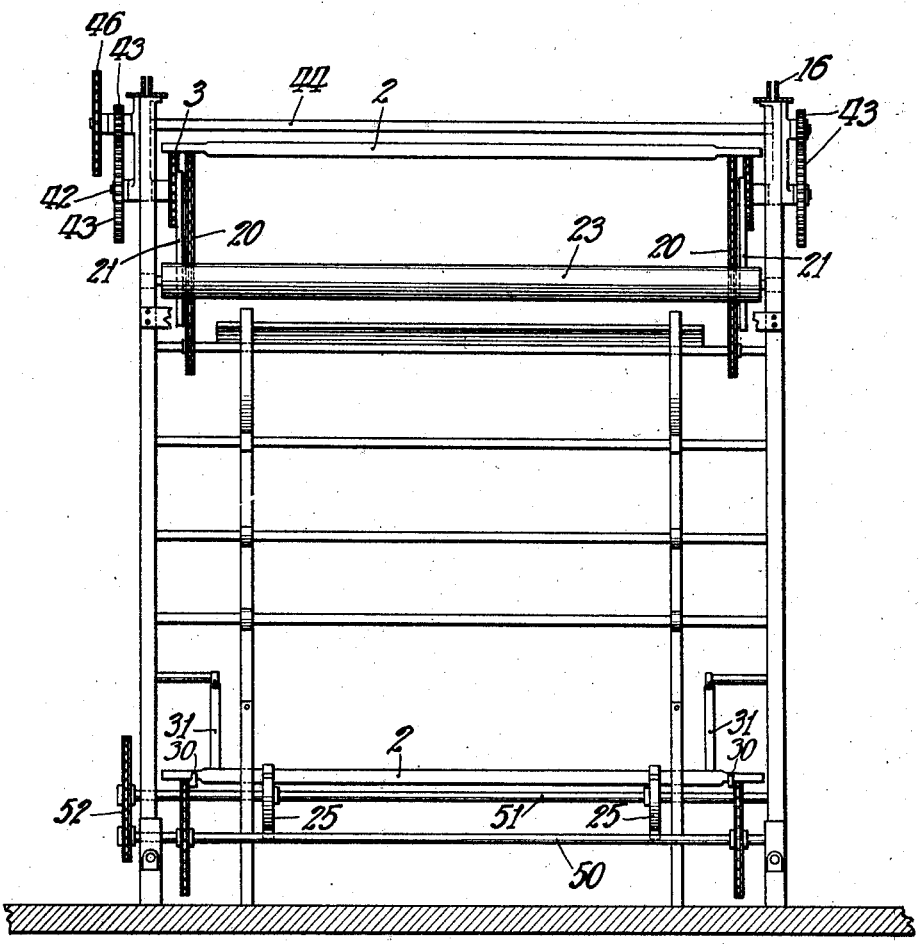

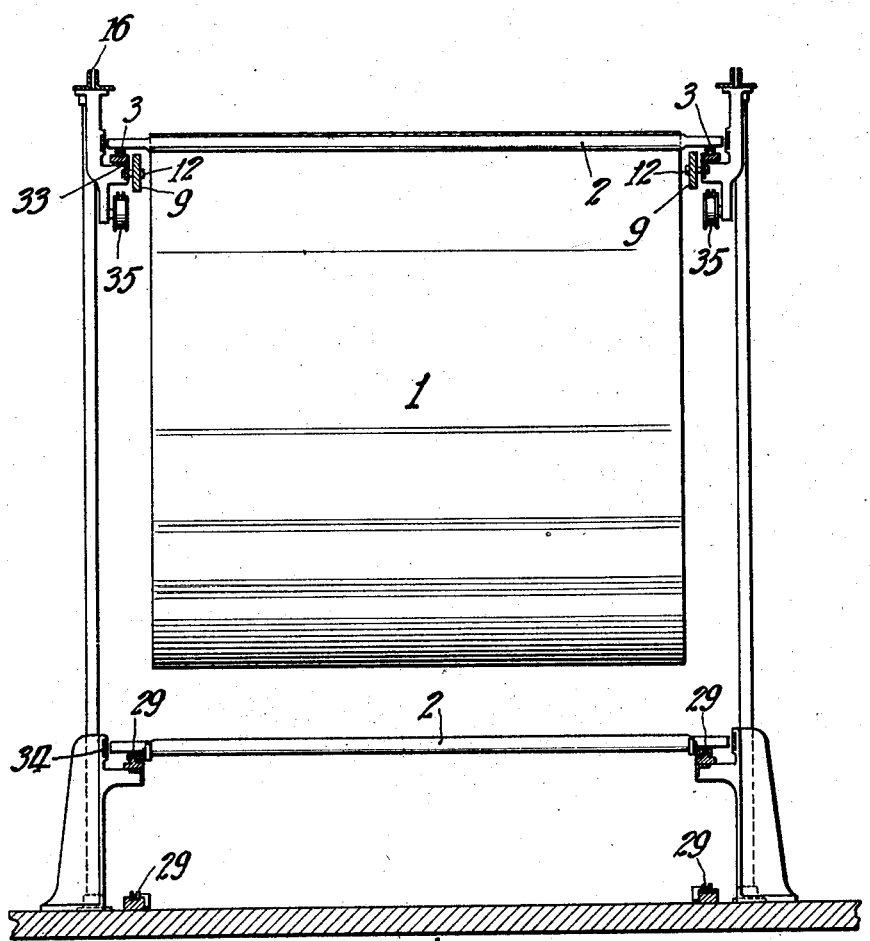
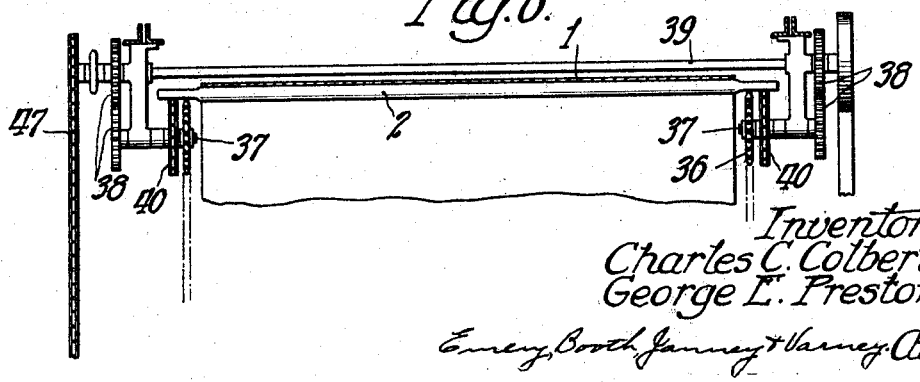

June 2, 1925.
C. C. COLBERT ET AL
1,540,721
HANG-UP APPARATUS
Filed Oct. 3, 1923
7 Sheets-Sheet 6
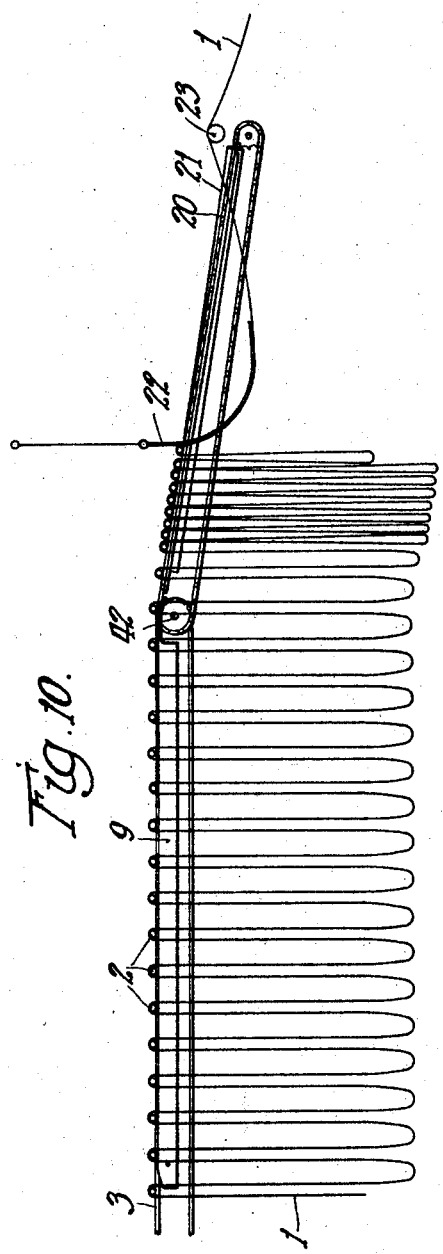
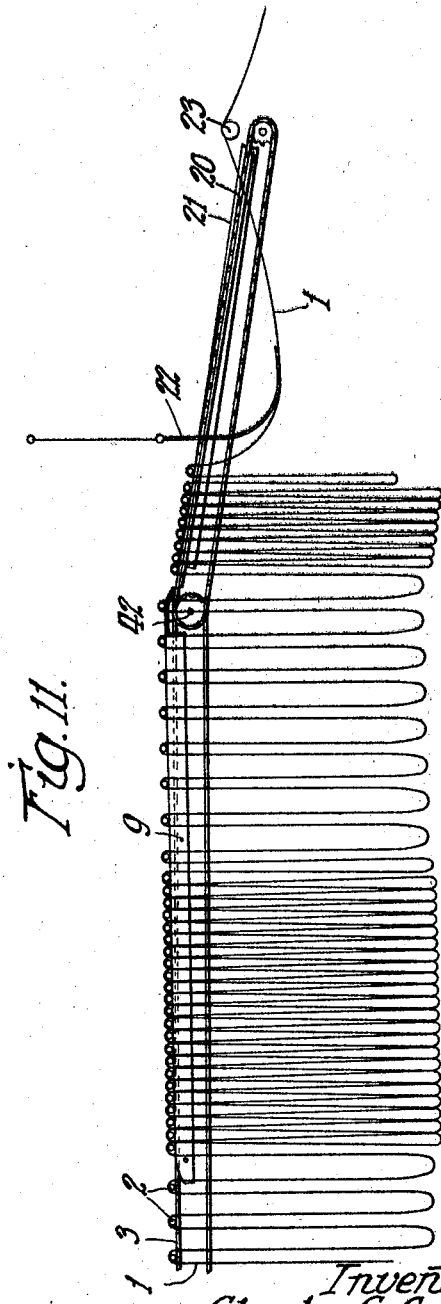
Inventors.
Charles C. Colbert.
George E. Preston.
Emery, Booth, Janney & Varney. Attys June 2, 1925.
C. C. COLBERT ET AL
1,540,721
HANG-UP APPARATUS
Filed Oct. 3, 1923        7 Sheets-Sheet 7
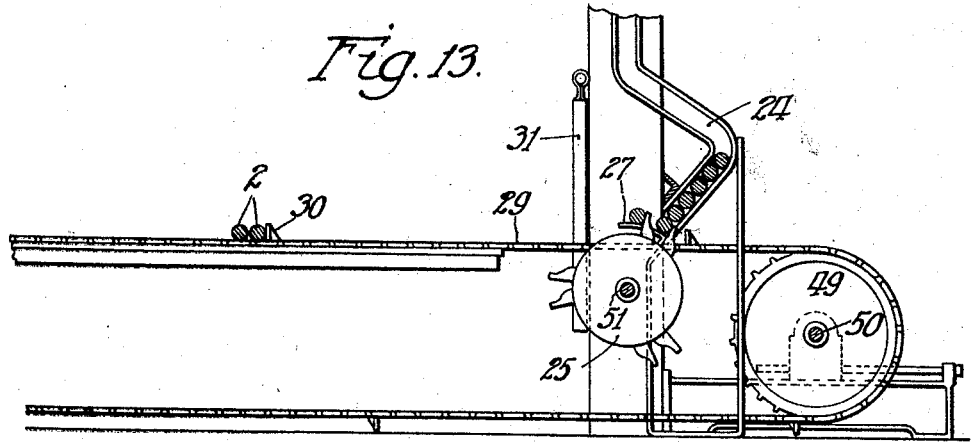
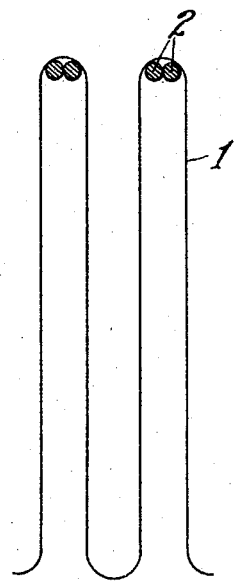
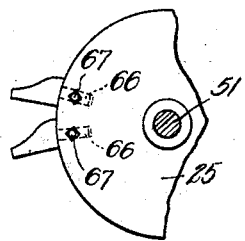
Inventors.
Charles C. Colbert.
George E. Preston.
Emery, Booth, Janney & Varney. Attys.

Patented June 2, 1925.

1,540,721

UNITED STATES PATENT OFFICE.

CHARLES C. COLBERT AND GEORGE E. PRESTON, OF ELKHART, INDIANA, ASSIGNORS TO AMERICAN COATING MILLS, OF ELKHART, INDIANA, A CORPORATION OF INDIANA.

HANG-UP APPARATUS.

Application filed October 3, 1923. Serial No. 666,267.

*To all whom it may concern:*

Be it known that we, CHARLES C. COLBERT and GEORGE E. PRESTON, citizens of the United States, and residents of Elkhart, in the county of Elkhart and State of Indiana, have invented an Improvement in Hang-Up Apparatus, of which the following is a specification.

This invention relates to the class of apparatus employed for hanging up sheet material, such for instance as paper board, coated paper or the like, during storage, seasoning, drying or other treatment.

Among other objects the invention is intended to provide hang-up apparatus of variable accumulating capacity, which can be operated without manual manipulation of the hanging material or its supports, and from which the material can be withdrawn without injury.

The invention will be clearly understood by reference to one practicable form of hang-up apparatus embodying the invention which is shown for illustration in the annexed drawings.

In said drawings:

Fig. 1 is a side view of the illustrative apparatus.

Fig. 2 is a plan view thereof.

Fig. 3 is an enlarged side view of the delivery end of said apparatus.

Fig. 4 is an end view of Fig. 3.

Fig. 5 is a vertical cross-section taken on the line 5—5 of Fig. 1.

Fig. 6 is a vertical section on the line 6—6 of Fig. 1.

Fig. 7 is a detail view of a dead rack rail embodied in the apparatus, with dotted lines indicating the elevated position of the rail.

Fig. 8 is a cross-section on the line 8—8 of Fig. 7.

Fig. 9 is a detail side view showing the ejector wheel drive.

Figs. 10 and 11 are side views of the delivery end of the apparatus under different accumulating conditions.

Fig. 12 is a detail view representing successive folds of material each supported by a pair of sticks instead of by single sticks as represented in the preceding figures.

Fig. 13 is a side view showing a portion of the return conveyor of the sticks adapted for circulating two sticks at a time instead of one.

Fig. 14 is an enlarged fragmentary view of one of the ejector wheels, illustrating the manner of mounting the ejector lugs detachably on the ejector wheel.

The illustrative apparatus is adapted for collecting a supply of continuous material 1 in suspended festoons or folds while the material is being introduced into the receiving end of the apparatus and withdrawn from its delivery end. The material is carried by and hangs from transverse supports provided by so-called sticks 2. Conveying means for said sticks is represented by parallel endless chains 3, appropriately spaced for supporting the ends of the sticks while allowing the festoons of material to hang between the chains.

The sticks 2 may consist of round wooden poles, providing rounded supports for the hanging material, and the ends of the sticks may be flattened to enable them to rest upon their conveying chains without tendency to roll or turn on the chains.

The material 1 may be continuously supplied from a producing or treating machine, and may be delivered to the hang-up apparatus by a conveyor 4 or over a roller or other means at an appropriate elevation for the in-feeding of the material.

For hanging up the material, as it is delivered to the apparatus, the sticks 2 are successively brought under the material at appropriate intervals of time to allow desired lengths of the material to sag between the successively presented sticks and between the conveyor roller 5 and the stick being carried into use, as shown in Fig. 1.

This is performed in the illustrative apparatus by endless elevating chains 6, running at an upward inclination, and having appropriately spaced lugs 7 for supporting the sticks. The elevating chains take up the sticks from holders 8 to which the sticks are successively introduced by means hereinafter described. These holders 8 are shown as semicircular guideways coaxial with the lower sprocket wheels of the elevating chains.

The elevating chains 6 deliver the sticks to the longitudinally running chains 3 which if desired may have a considerably slower rate of movement than the elevating chains, so as to cause the sticks to be deposited upon the chains 3 at closer intervals and consequently to hang the material in closer folds.

The chains 3 typify conveying means of any desired length and character along which the material accumulates in hanging festoons or folds. Said conveying means may if desired comprise successive pairs of carrier chains, running at the same or different speeds for varying the widths of the festoons, and may be associated with any appropriate means for exposing the material conveyed to the action of a heating medium or other treating means during its transportation through the hang-up apparatus.

From the accumulated supply of slack material hanging in the hang-up apparatus, the material may be continuously withdrawn either for subsequent treatment in the course of its manufacture or for reeling in the case of finished material. It may be desirable to vary the amount of accumulation in the hang-up apparatus for the purpose of controlling a period of seasoning, drying or other treatment of the hanging material, or for accommodating the accumulation to conditions arising in the operation of a plant in which the apparatus is included.

For example, where the illustrative apparatus is arranged between a machine for producing raw paper, paper board or the like and a subsequent machine for coloring or otherwise treating the material, it is desirable in event of temporary interruption of such subsequent machine to permit continuous operation of the producing machine with continuing delivery to and accumulation of the material in the hang-up apparatus, without necessitating continued withdrawal of the material therefrom. On the other hand, where the hang-up apparatus receives material from a preceding treating machine and delivers to a finishing machine, it is desirable in event of temporary interruption of operation of said treating machine to have an ample reserve supply of material in the hang-up apparatus from which the finishing machine may continue to draw its supply.

The illustrative hang-up apparatus embodies provision for variation of accumulating capacity in several ways. In event of any interruption or slowing of operation in a succeeding machine or unit of the plant, thereby interrupting or slowing the withdrawal of material from the delivery end of the apparatus, the hanging folds of material can crowd together in said delivery end as represented in Fig. 10, and as will be explained more fully hereinafter. Considerable variation of accumulation may also be obtained by a speed adjustment hereinafter described. In addition to these provisions, a large reserve supply of the hanging material may be stored at will in the hang-up apparatus by the means now to be described.

Associated with the carrier chains 3 is a dead rack comprising longitudinal rails or bars 9, one beside each of the parallel chains (Figs. 3, 7, 8, 10 and 11). These dead rack bars 9 are supported so as to permit them to be depressed below the levels of the carrying runs of the chains, in the position shown in Fig. 3, which is their normal position, or to be elevated above the chains in the position indicated by dotted lines in Fig. 7. The rear ends of said bars are bevelled or inclined as indicated at 10 so that, when the bars are in the elevated position indicated by dotted lines in Fig. 7, the sticks 2 carrying the festoons of material may ride onto the dead rack bars, after which the sticks will be pushed along said bars one by the other, as represented in Fig. 11. Thus a large number of festoons or hanging folds of material may be accumulated closely on the dead rack. The delivery ends of the dead rack bars are shown provided with curved extensions 11 which in the elevated position of the bars will overlie the sprocket wheels at the delivery ends of the carrier chains and permit the sticks to be discharged from the delivery end of the dead rack.

In the specific construction shown in the drawings, the dead rack bars 9 are pivoted at their receiving ends to suitable supports, indicated at 12 (Fig. 7), while their delivery end portions are carried by hangers 13 suspended from cranked portions of a crank shaft 14 journalled in bearings 15 in the upper framework 16 of the hang-up apparatus (Figs. 7 and 8). One of the cranked portions of the crank shaft 14 is provided with an operating lever 17 which may be operated in one direction or the other by pull cords 18 and 19. By this means the cranked portions of the crank shaft may be moved to a position of dead centers with respect to the bearings of the crank shaft, thus supporting the dead rack bars 9 in elevated position, and the parts may be maintained in this position by maintaining the pull cords 18 and 19 taut and fastening them at any convenient place.

One or more additional reserve racks (not shown) may if desired be provided in advance of that shown, so as further to increase the storage capacity of the hang-up apparatus if required.

At the delivery end of the illustrative hang-up apparatus (Figs. 3 and 4), means are provided to facilitate withdrawal of the material from the accumulated supply hung up in said apparatus. For this purpose the carrier chains 3 deliver the sticks carrying the suspended folds of material upon declined delivery chains 20, from which the sticks are delivered to declined rails 21 arranged beside said chains and gradually rising to an elevation above the chains to permit the sticks to ride from the chains onto said rails. The suspended material is withdrawn from the sticks resting on said rails, while the sticks slide down the rails and are discharged.

If the dead rack bars 9 are depressed, as shown in Fig. 3, the sticks 2 will ride from the chains 3 onto the chains 20 and thence onto the rails 21, and the sticks will be caused to slide down the rails under the drag of the hanging material as it is withdrawn by a succeeding treating, finishing, reeling or other machine. If the withdrawal of the material should be interrupted by temporary interruption in the operation of a succeeding unit of the plant, the sticks with the hanging folds of material may crowd together and accumulate on the declined rails 21 as shown in Fig. 10. If the interruption of withdrawal is for a longer period than that which can be accommodated by the accumulating capacity of said rails, while the material is being continuously supplied to and hung up in the apparatus, the dead rack bars 9 should be elevated, as already explained, allowing the successively advancing sticks carrying the festoons of material to collect in crowded assembly on said bars, as shown in Fig. 11.

Upon resumption of operation in the succeeding unit of the plant, with accompanying resumption of the withdrawal of the material from the hang-up apparatus, the dead rack bars may be depressed to allow the sticks to rest again upon the conveying chains 3, which will deliver the crowded sticks onto the chains 20 and thence onto the rails 21; and the operation of said succeeding unit may be temporarily speeded up to effect a more rapid withdrawal of the material until the excess accumulation is drawn off and normal conditions restored.

The rails 21 retard the travel of the sticks, and offer a desirable frictional resistance to the movement of the sticks as the sagging material is withdrawn over the sticks. Furthermore, under various conditions, these rails permit the sticks to accumulate one or more behind another during and until the withdrawal of the board from folds suspended between successive sticks, thus avoiding continued travel of the sticks during the withdrawal.

The pull of the material as it is withdrawn from the hang-up apparatus drags the sticks down the declined rails and causes them to slide down the rails and to be discharged. There may frequently be a number of sticks in close relation on the rails. To prevent the pull of the material from dragging the sticks and crowded festoons of material too rapidly down the rails, and to prevent jerking of the material from the successive folds, there is provided a suspended or swinging wiper 22 (Figs. 3, 10 and 11), such for instance as a sheet of carpet or other suitable flexible material, which rests upon and drags against the material and exerts a retarding action on the sticks. Thus the material is withdrawn against the resistance of the swinging wiper 22 and of the sticks in frictional contact with the declined rails 21, contributing to smooth and even withdrawal.

The material may be withdrawn from the hang-up apparatus over a guide roller 23, while the sticks 2 slide down the rails 21 onto the delivery ends of the chains 20 and are deposited into a magazine comprising parallel guides 24 which are zig-zag shaped to break the fall of the sticks (Figs. 3 and 9). The sticks pile one upon another in the magazine, in which a reserve supply of the sticks is maintained, and the sticks are successively ejected from the lower end of the magazine by rotating wheels 25 having ejecting lugs 26. To permit ejection, the lower ends of the magazine guides 24 are shown constructed with feet 27 to support the sticks and with ejecting openings 28.

The ejected sticks are carried by a return conveyor 29 back to the receiving end of the hang-up equipment. Said return conveyor is shown as a pair of parallel chains provided at suitable intervals with lugs 30 for engaging and forwarding the sticks. As the sticks are successively ejected from the magazine, swinging bumpers 31 knock against the sticks to steady them and prevent them from being thrown too far. As a means for straightening or aligning the sticks crosswise on the return conveyor, inclined obstructors 32 are arranged in the path of the sticks, over which the sticks must ride, thus insuring their lodgment against the lugs 30 of the return conveyor chains and their delivery to the receiving end of the hang-up apparatus in proper transverse alignment.

At the receiving end of the hang-up equipment, the return conveyor 29 delivers the sticks into the curved guideways 8, associated with the lower sprocket wheels of the elevating chains 6, and the lugs 7 of the elevating chains pick up the sticks and carry them successively under or into position for hanging up the in-feeding material as before explained.

Thus the sticks are circulated back and forth through the hang-up apparatus, and a reserve supply of sticks is maintained in the magazine 24, to permit variation in the number of sticks employed at a given time according to conditions existing as to capacity of accumulation of the material, as determined by speed adjustment, by adjustment of the reserve rack bars 9 or other conditions.

In the organization of the hang-up apparatus represented in Figs. 1 to 11 inclusive, the sticks 2 are employed singly as supports for the hanging material. Hence the sticks are ejected one at a time from the magazine guides 24, at such intervals of time as to be successively engaged and forwarded by the successive lugs 30 of the return conveyor 29, and are delivered one at a time into the curved guides 8 at proper periods to be engaged and picked up by the successively advancing lugs 7 of the elevating chains 6. Should it be desired to use the sticks in pairs or groups as individual supports for the hanging material, as indicated in Fig. 12, the ejecting wheels 25 at the delivery end of the apparatus may be equipped with additional ejecting lugs, or have its lugs arranged in pairs, as shown in Fig. 13, so as to cause ejection of the sticks in pairs or groups between the successive lugs of the return conveyor, which will then deliver the ejected pairs or groups of sticks one after another into the circular guides 8 to be picked up by the lugs of the elevating chains.

Such utilization of pairs or groups of sticks as individual supports is advantageous in hanging up certain kinds of material such as very heavy or stiff board when it is desired to relieve the bending of the board. The illustrative apparatus is convertible for circulating the sticks singly or in groups as may be required or preferred according to the material under treatment. To facilitate such conversion, the ejector wheels 25 may be provided with sockets for the shanks 66 of detachable ejector lugs which may be fixed in place by set screws 67 or the like.

The several endless chains constituting the stick conveying system of the apparatus may have their upper runs supported on suitable rails 33 and may be associated with side rails 34 (Figs. 5 and 6) for guiding the ends of the sticks and for preventing the sticks from shifting lengthwise, i. e. transversely of the hang-up apparatus. Idle sprockets or guide wheels 35 for guiding the lower runs of the chains may be provided as required. The means shown in the drawings for driving the conveying system of the illustrative hang-up apparatus is as follows:

The elevating chains 6 are trained at their upper ends around driving sprockets 36 affixed on stub shafts 37, driven by gearing 38 from an overhead shaft 39 (Figs. 1 and 2). On the same stub shafts 37 are loose sprocket wheels 40 around which are trained the receiving ends of the longitudinally running carrier chains 3. Said chains 3 are trained at their delivery ends around driving sprockets 41 affixed on stub shafts 42 driven by gearing 43 from an overhead shaft 44 (Figs. 3 and 4). On the same stub shafts 42 are affixed driving sprockets 45 for the declined delivery chains 20. Should the longitudinal conveying means comprise more than a single pair of chains, for instance, successive pairs of chains, as may be desired in a lengthy conveying system, each pair of such chains may be trained at their delivery ends around driving sprockets, coaxial with driven sprockets for the receiving ends of the next pair of chains, such driving and driven sprockets being mounted fast and loose on stub shafts driven by gearing from an overhead shaft, in the same manner as explained in reference to the chains 6 and chains 3, the delivery and receiving ends of which are respectively trained around the coaxial fast and loose sprockets 36 and 40 on the stub shafts 37 driven from overhead shaft 39. In the case of conveying means comprising such successive pairs of chains, the several overhead shafts may be driven by transmission chains one from another, and at the same or varying speeds as desired. In the illustrative apparatus, where the longitudinal conveying means comprises the single pair of carrier chains 3, the overhead shaft 44 at the delivery section of the apparatus is driven by an endless chain 46 from the overhead shaft 39 at the receiving section; and said overhead shaft 39 is driven by a chain 47 from a shaft 48 shown located below the floor of the plant (Figs. 1 and 2).

Referring to the return conveyor 29, at its receiving end, i. e. at the delivery end of the hang-up apparatus, the return conveyor chains are trained around driven sprockets 49 on a shaft 50, from which shaft 50 the shaft 51 of the ejecting wheels 25 is driven by a chain 52 (Figs. 9 and 13). By employing a slack driving chain 52, the ejector wheels may be operated with an intermittent jerking action for effectively discharging the sticks, the resistance to ejection due to the weight of the superimposed pile of sticks in the magazine will retard the rotation of the ejector wheels until the chain 52, driven by the comparatively slow running shaft 50, stretches or becomes taut in its lower run, thereby imparting a sudden rotation or jerk to the ejector wheels causing them to eject the stick or sticks and to overrun the chain drive so as to slacken the lower run while the upper run becomes taut to check the rotation of the ejector wheels. As soon as the chain becomes taut in its lower run, the upper run becoming slack, the action is repeated, and so on.

At the delivery end of the return conveyor, i. e. at the receiving end of the hang-up apparatus (Figs. 1 and 2), the return conveyor chains are trained around driving sprockets 53 on shaft 54 which is driven by a chain 55 from a shaft 56, also shown below the floor of the plant. That portion of the driving mechanism located below the floor of the plant is shown in dotted lines in Fig. 2.

The shafts 48 and 56 are driven by the chains 57 and 58 respectively (Figs. 1 and 2) from a shaft 59 adapted to be connected by clutch 60 with a pulley 61 driven by a belt 62 from a Reeves variable speed transmission mechanism which as a whole is indicated by the numerals 63 (Fig. 1), said Reeves mechanism being driven by the belt 64 from a suitable source of power or from a transmission mechanism connected with a preceding or succeeding unit of the plant in which the hang-up apparatus is included so as to be operated in synchronism therewith. A lever 65 for controlling the clutch 60 is shown projecting above the floor of the plant (Fig. 2), whereby the attendant at the hang-up apparatus may conveniently connect or disconnect the power for operating the apparatus as required.

By means of the variable speed mechanism 63, the speed of the conveying system of the hang-up apparatus may be varied in relation to the rate of delivery of the material 1 to the apparatus, thereby varying the intervals of hanging up the board in festoons by the sticks on the elevating chains, and consequently varying the amount of material in individual festoons. Thus considerable variation of the accumulating capacity of the hang-up apparatus may be effected by speed adjustment; a slight reduction or increase of speed resulting in a considerable increase or reduction in the amount of material hung up. Hence the speed may be controlled to maintain a given quantity of accumulated material between successive machines of the plant, as for instance between a producing and coating machine or between a coating and finishing machine, or to accommodate variations in speed between the rates of delivery of the material to the hang-up apparatus and the withdrawal of the material from the apparatus, or to adapt speed conditions to different adjustments of accumulating capacity as determined by the use of one or more dead racks for collecting a reserve quantity of the material.

Obviously the present invention is not limited to the specific details of construction, arrangement and mode of operation shown in the drawings, since the same may be variously modified to suit different conditions or requirements. Moreover it is not indispensable that all the features of the invention be used conjointly, since they may be advantageously used in various different combinations and sub-combinations.

Having thus described our invention, we claim:

1. An apparatus of the class described comprising, in combination, means for accumulating continuous material in loosely hanging festoons or folds, while supplying said material to and withdrawing it from the apparatus; and means operable without affecting the rate at which the material is supplied to and withdrawn from said apparatus to alter the speed of hanging up and conveying the material and thereby altering the length of individual festoons for varying the accumulating capacity of the apparatus.

2. An apparatus of the class described comprising, in combination, means for conveying material hanging in festoons or folds; and a swinging wiper of flexible material arranged above and engaging the material for exerting a frictional drag thereon as the material is withdrawn from the delivery end of the apparatus.

3. An apparatus of the class described comprising, in combination, means for conveying material hanging in festoons or folds; means at the delivery end of the apparatus permitting collection of folds in close assembly during withdrawal of the material from the folds; and suspended flexible means lying upon and exerting a frictional drag on the material as it is withdrawn.

4. An apparatus of the class described comprising, in combination, supports moving in a circuitous course; means cooperating with successively presented supports for hanging up material in festoons or folds, which are carried by the travelling supports to a place where the material is withdrawn from the supports; means for moving said supports through said circuitous course; and means for retarding the supports as the material is withdrawn therefrom.

5. An apparatus of the class described comprising, in combination, supports travelling in a circuitous course; means cooperating with successively presented supports for hanging up the material in festoons or folds, which are carried by said supports to a place where the material is withdrawn from the supports; and means exerting a frictional drag on the material as it is withdrawn from the supports.

6. An apparatus of the class described comprising, in combination, supports travelling in a circuitous course; means cooperating with successively presented supports for hanging up material in festoons or folds, which are carried by said supports to a place where the material is withdrawn from the supports; and a wiper swingingly mounted above and engaging said material to exert a frictional drag thereon and retarding the moving of said supports as the material is withdrawn therefrom.

7. An apparatus of the class described comprising, in combination, means for hanging up material in festoons or folds on successively presented supports; means for conveying said supports with the hanging material; means to which the supports are delivered permitting the material to be withdrawn while said supports rest on said means; and a swinging wiper suspended above and engaging said material to exert a frictional drag thereon and retarding the movement of said supports as the material is withdrawn therefrom.

8. An apparatus of the class described comprising, in combination, means for elevating supports successively for hanging up material in festoons or folds; means for conveying said supports with the hanging festoons or folds, declined rails onto which the supports ride at the delivery end of the apparatus; means in advance of said declined rails for collecting said supports and hanging festoons in closely assembled condition; a magazine into which the supports are deposited from said declined rails as the material is withdrawn from said supports; and means for sequentially withdrawing said supports from said magazine and returning them to the elevating means.

9. An apparatus of the class described comprising, in combination, a plurality of supports travelling in a circuitous course; a magazine containing a reserve supply of said supports interposed in said course; means cooperating with successively presented supports for hanging up material in festoons or folds, which are conveyed by such supports to a place where the material is withdrawn therefrom; means for delivering said supports to said magazine as the material is withdrawn from the supports; and means for said supports withdrawing in proper sequence from said magazine and returning them one after another to position for successive presentation for hanging up the material.

10. An apparatus of the class described comprising, in combination, conveying means for a plurality of supports from which material hangs in festoons or folds; means for hanging up material on successive supports and placing said supports on said conveying means; declined rails onto which said supports are delivered permitting withdrawal of the material while discharging the supports; a zig-zag magazine into which the supports are discharged from said rails as the material is withdrawn from said supports; and means for withdrawing the supports sequentially from said magazine and returning the supports to the means for presenting them for hanging up the material.

11. An apparatus of the class described comprising, in combination, conveying means; transverse supports; means for hanging up material in festoons or folds on successive supports and placing said supports on said conveying means; dead rack bars having their upper surfaces normally below said conveying means; and supporting means for said dead rack bars whereby they may be elevated to allow said supports to ride onto said bars from said conveying means.

12. An apparatus of the class described comprising, in combination, means for hanging up material in festoons or folds and conveying the hanging folds, while supplying said material to and withdrawing it from the apparatus; and means for varying the speed of hanging up the material relative to the in-feeding thereof and thereby varying the length of material in individual festoons.

13. An apparatus of the class described comprising, in combination, transverse supports from which continuous material hangs in festoons or folds; conveying means for said supports; a rack associated with said conveying means; and means for adjusting said rack to raise the supports out of contact with said conveying means.

14. An apparatus of the class described comprising, in combination, transverse supports for hanging material; conveying means for said supports; a rack associated with said conveying means, comprising longitudinal bars normally below the conveying means; and means for adjusting said rack to raise the supports out of contact with said conveying means; said adjusting means comprising a transverse crank shaft above the conveying means, hangers suspended from cranked portions of said shaft and supporting said bars, and an operating lever for said shaft adapted to be moved to a position of dead centers with respect to said cranked portions for holding the crank shaft in position to maintain the bars raised.

15. An apparatus of the class described comprising, in combination, transverse supports; means for successively presenting said supports for hanging up material; conveying means for said supports; a magazine into which said supports are discharged as the material is withdrawn from the supports; means for successively ejecting said supports from the magazine; means for returning said supports to the means for successively presenting the same; the several means for circulating said supports being connected for operating in timed relation; a source of power; a variable speed mechanism driven therefrom; and means for driving the aforesaid means from said variable speed mechanism.

16. An apparatus of the class described comprising, in combination, transverse supports; means for hanging up and conveying material on successively presented supports; a magazine into which the supports are deposited as the material is withdrawn from the delivery end of the apparatus; means for ejecting said supports from said magazine; a return conveyor for returning said supports to position for hanging up the material; swinging bumpers for steadying said supports as they are ejected from the magazine; and means for aligning said supports transversely on said return conveyor.

17. An apparatus of the class described comprising, in combination, transverse supports; means for hanging up and conveying material on successively presented supports; and a magazine in which said supports are deposited at the delivery end of said apparatus, said magazine having a zig-zag shaped passage in which the supports pile one upon another; and means for returning the supports from said magazine.

18. An apparatus of the class described comprising, in combination, transverse supports; means for hanging up and conveying material on successively presented supports; a magazine containing a supply of sticks to provide said supports; and means convertible for ejecting said sticks singly or in groups to provide individual supports.

In testimony whereof, we have signed our names to this specification.

CHARLES C. COLBERT.
GEORGE E. PRESTON.